Feb. 11, 1958

K. J. AVERSTEN 2,823,297

METAL STUB PROVIDED WITH AN OPEN RECESS FOR
A FLUX AT AN END THEREOF

Filed Dec. 28, 1953

INVENTOR
KARL J. AVERSTEN,

BY Larson and Taylor
ATTORNEYS

United States Patent Office 2,823,297
Patented Feb. 11, 1958

2,823,297

METAL STUD PROVIDED WITH AN OPEN RECESS FOR A FLUX AT AN END THEREOF

Karl J. Aversten, Lidingo, Sweden, assignor to Svenska Aktiebolaget Gasaccumulator, Lidingo (near Stockholm), Sweden, a corporation of Sweden Application December 28, 1953, Serial No. 400,823

Claims priority, application Sweden January 10, 1953

1 Claim. (Cl. 219—99)

The present invention refers to metal studs with a recess provided for a flux at one end of the stud and which are adapted to be fastened to a metal surface by electrical melting of the end provided with the flux and subsequent solidification of the melt formed. It has before been proposed to provide the end of the stud with a central recess for the flux large enough to leave only a very narrow, angular rim portion, the recess with the inserted flux being either left uncovered or being covered with a cap. In the former case there are disadvantages in that the flux may easily fall out unless specific steps have been taken to attach it, for instance by adding a binder to the flux mass, which is thereafter left to harden before transportation or use of the metal stud. However, such binder delays the melting of the flux. In the latter case there are disadvantages in that the manufacture and the attachment of the cap require a certain amount of extra work and time and also the cap has to be melted down before the flux mass can flow out of the recess.

The said disadvantages are avoided according to the present invention by providing the metal stud with a bulged end face having its greatest height at the middle of the end face, a plurality of recesses for the flux being distributed comparatively evenly over the bulged end face and being relatively narrow, so as to retain therein a loose, powdery flux. If the end face of the metal stud is formed of a piece of metal different from the remaining part of the stud, the recesses have suitably a depth essentially equal to the axial length of the end portion.

Figure 1:
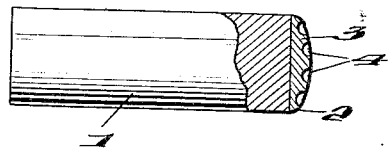
Figure 2:
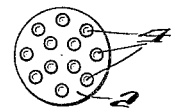
Figure 3:
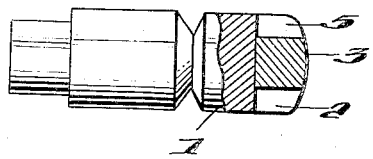
Figure 4:
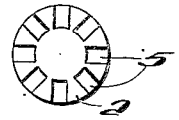

The invention is illustrated by means of some embodiments thereof shown on the annexed drawing. Fig. 1 shows a metal stud according to the invention in a partial side view and partial longitudinal section. Fig. 2 shows an end view of the stud of Fig. 1. Fig. 3 shows a side elevation of a metal stud of modified construction, parts being broken away and shown in section. Fig. 4 shows an end view of the stud of Fig. 3.

According to the embodiment shown in Figs. 1 and 2, a metal stud comprises a main portion 1 which may be formed, for instance, of steel, iron, brass, aluminium or some other light metal and an end portion 2 of a metal of lower melting point or a solder metal, such as welding bronze, silver solder, aluminium solder or the like. The end portion 2 has a bulgy or convex end face 3, in which a large number of relatively narrow recesses 4 are provided.

Immediately before use of the metal stud, the end thereof is dipped into a loose, powdery flux mass, which penetrates into the recesses 4 and remains in them owing to their narrowness even when the stud is extracted from the flux mass. The stud is inserted in a welding gun and the end thereof filled with flux is brought into contact with the metal surface to which the stud is to be fastened, i. e. the mid portion of the end face forms the contact area and the apertures of the recesses 4 are left uncovered around the contact area. Upon melting of the flux mass through the arc formed between the middle portion of the stud and the metal surface (workpiece) when current is applied to the stud, the flux will flow swiftly and without obstruction, immediately upon starting of the arc, forward to the metallic melt formed at the end of the stud.

The stud shown in Figs. 1 and 2 is primarily intended for use when the main portion 1 thereof is to be attached to a metal workpiece by melting of the end portion 2, which forms upon solidification the attachment of the stud to the workpiece. The end portion is then relatively thin or of relatively small length axially and only a small amount of flux is required and can be lodged in the relatively shallow recesses 4.

In other cases, for instance when the main portion 1 of the stud is to be joined not only with a workpiece located in front of the end face of the stud but also with the wall of an aperture surrounding at least part of the main portion 1 of the stud, it is necessary to have an end portion 2 of relatively great axial length and a considerable quantity of powder has to be accommodated in the end of the stud. This is possible owing to the greater length of the end portion, which permits the formation of deeper recesses than those shown in Figs. 1 and 2.

An embodiment having a comparatively long end portion 2 is shown in Figs. 3 and 4. The recesses 5 extend over the entire axial length of the end portion 2 and, moreover, are comparatively deep radially but narrow enough to retain securely a loose flux mass. The recesses 5 further extend as far as the periphery of the end portion 5, so that there is flux present at these points also, which can easily flow out onto the adjacent periphery of the main portion 1 when the stud is attached.

The construction of the metal stud and the shape of the recesses as well as their positions can obviously be varied within the scope of the invention. In the embodiments shown, the metal stud comprises axially adjacent parts but it could also be formed of a single piece or a greater number of axially disposed parts.

What is claimed is:

A soldering stud for connection to a metallic surface by the use of electric arc techniques comprising a main part and an end contact part joined thereto and completely covering one end face of the main part, said end part having a lower melting point than that of the main part and having an end face of convex formation and being provided with a plurality of open recesses for accommodating flux, said recesses being substantially evenly distributed over said face and being of comparatively small cross section so as to be capable of retaining flux in the form of loose powder, the midportion of said face being free of said recesses to provide an arc-striking area.

References Cited in the file of this patent

UNITED STATES PATENTS

| 2,402,659 | Nelson | June 25, 1946 |
| 2,413,370 | Palmer | Dec. 31, 1946 |
| 2,446,524 | Brennan | Aug. 10, 1948 |
| 2,455,244 | Evans | Nov. 30, 1948 |
| 2,462,882 | Martin | Mar. 1, 1949 |
| 2,553,499 | Graham | May 15, 1951 |
| 2,711,798 | Aversten | June 28, 1955 |
| 2,788,233 | Enright | Apr. 9, 1957 |

FOREIGN PATENTS

| 134,837 | Australia | Dec. 24, 1949 |
| 1,009,621 | France | Mar. 12, 1952 |